(12) United States Patent
Liu et al.

(10) Patent No.: US 7,532,437 B2
(45) Date of Patent: May 12, 2009

(54) SLIDER HAVING TRANSDUCERS ORIENTATED IN DIFFERENT DIRECTIONS

(75) Inventors: Xiong Liu, Singapore (SG); Joseph Cheng-Tsu Liu, Singapore (SG); Choon Kiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 378 days.

(21) Appl. No.: 11/334,481

(22) Filed: Jan. 19, 2006

(65) Prior Publication Data

US 2007/0165331 A1    Jul. 19, 2007

(51) Int. Cl.
*G11B 5/60* (2006.01)

(52) U.S. Cl. .................................... 360/234.7

(58) Field of Classification Search ............... 360/234.7, 360/234.8, 235.4, 235.7, 235.8, 236.1, 236.9, 360/237, 120, 121, 235.6
See application file for complete search history.

(56) References Cited

U.S. PATENT DOCUMENTS

| | | | | |
|---|---|---|---|---|
| 3,582,571 | A * | 6/1971 | Sprott et al. ................ | 360/118 |
| 4,334,252 | A * | 6/1982 | Toriu ........................... | 360/234 |
| 4,472,752 | A * | 9/1984 | Lalesse ........................ | 360/121 |
| 5,229,903 | A * | 7/1993 | Hayakawa et al. .......... | 360/121 |
| 5,920,447 | A * | 7/1999 | Sakata et al. ................ | 360/121 |
| 6,005,751 | A | 12/1999 | Kazmierczak et al. | |
| 6,021,024 | A | 2/2000 | Akiyama et al. | |
| 6,034,846 | A * | 3/2000 | Ouchi et al. ................ | 360/121 |
| 6,650,506 | B1 | 11/2003 | Risse ....................... | 360/264.2 |
| 6,661,592 | B2 * | 12/2003 | Richter et al. .................. | 360/48 |
| 7,206,170 | B2 * | 4/2007 | Yip .......................... | 360/241.1 |
| 7,379,257 | B2 * | 5/2008 | Yamagishi .................... | 360/63 |

FOREIGN PATENT DOCUMENTS

JP    05342526    * 12/1993

OTHER PUBLICATIONS

Danish Search Report for Singapore Application No. SG 200602237-0 dated Oct. 23, 2006.
Abstract of Japanese Publication No. 11283222.
Abstract of Japanese Publication No. 2000123301.

* cited by examiner

*Primary Examiner*—Angel A. Castro
(74) *Attorney, Agent, or Firm*—Campbell Nelson Whipps LLC

(57) ABSTRACT

Transducers are oriented differently to address the skew phenomenon. This enables a greater area of the medium to be utilized for data storage, thereby increasing the storage capacity of the device implementing embodiments of the present invention.

6 Claims, 3 Drawing Sheets

SLIDER HAVING TRANSDUCERS ORIENTATED IN DIFFERENT DIRECTIONS

FIELD OF THE INVENTION

The present invention relates generally to data storage, and more particularly to overcoming constraints resulting from skew angle phenomena.

BACKGROUND OF THE INVENTION

In data storage systems where disc-shaped media are used, the media is generally rotated during operations. Data can thus be recorded in the form of one or more curved or circular tracks. Often, the transducers used for recording and retrieving data from the media are supported and moved in arcuate paths by an actuator which has an axis of rotation that does not coincide with the axis of rotation of the media. It follows that when the actuator is significantly skewed relative to the track tangent, the writer may overwrite to an adjacent track.

It is not easy to overcome such skew angle phenomena. One known method involves spacing adjacent tracks sufficiently apart to avoid overwriting to adjacent tracks, but this means that the overall storage capacity of the media will be reduced. To compound the problem, the skew angle is different for different orientations of the actuator.

The present invention therefore proposes a new approach to address this and other problems, thus offering advantages over the prior art.

SUMMARY OF THE INVENTION

Embodiments of the present invention include providing at least two similar transducers oriented in different directions such that adverse effects of the skew phenomenon can be reduced. Optionally, the plurality of transducers are spaced apart on the same support so as to reach further parts of the medium without the need to increase the range of movement of the support. Overall, a greater area of the medium can be utilized for data storage, which means that the maximum amount of data that can be stored in a device can be increased.

These and various other features as well as advantages which characterize the present invention will be apparent upon reading of the following detailed description and review of the associated drawings.

DETAILED DESCRIPTION

Figure 1:
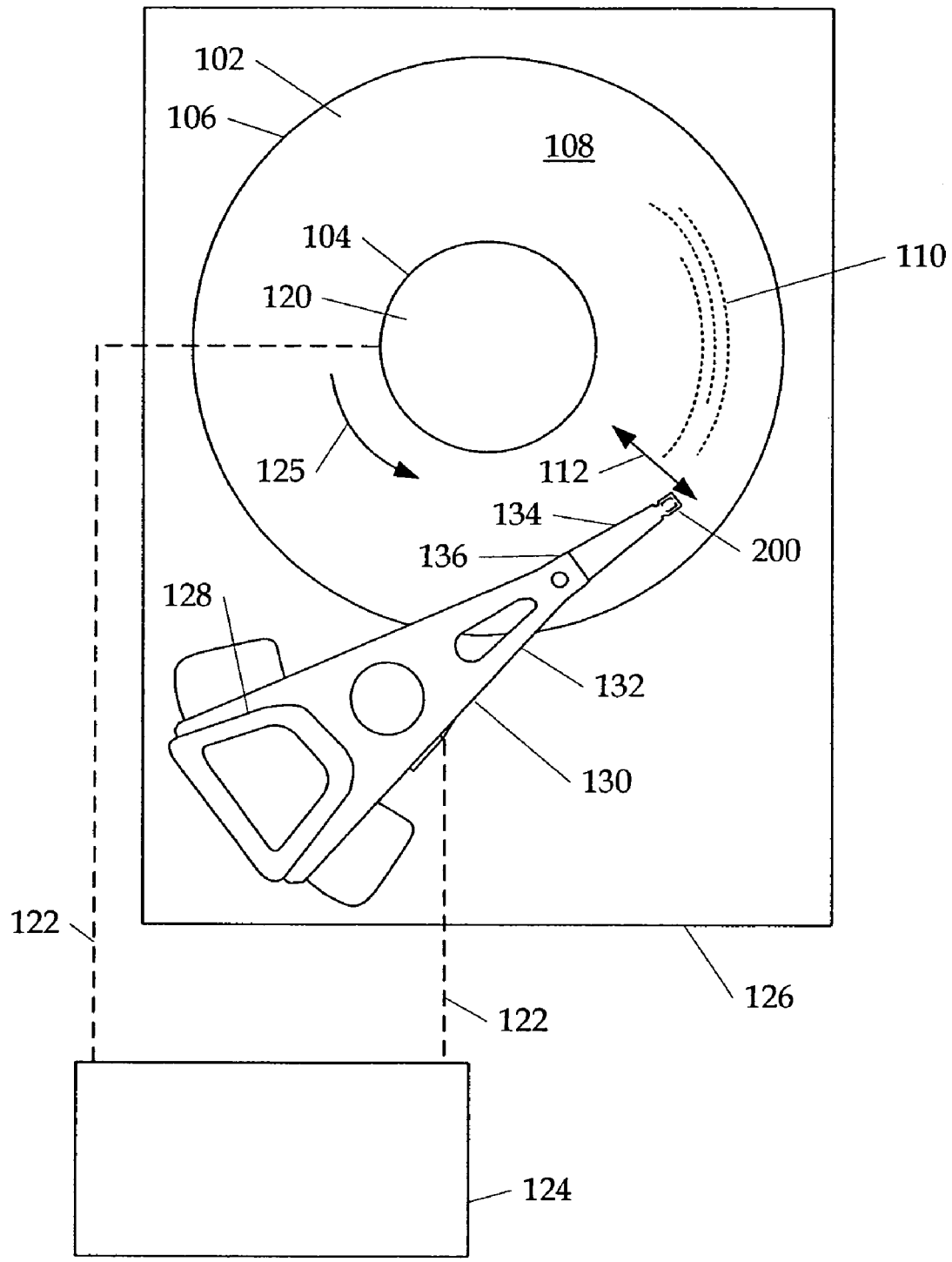
FIG. 1 is a schematic drawing of a data storage device employing a disc-shaped medium.

For ease of understanding and without intention to be limiting, embodiments of the present invention will be described with reference to a disc drive 100, such as one schematically presented in FIG. 1.

A medium 102 in this example is flat and annular, with an inner edge 104 and an outer edge 106 bounding at least one surface 108 which can be formatted for storing data. Data can generally be stored in one or more tracks 110. Depending on the mechanism used, the tracks 110 may be a continuous spiral or a plurality of generally concentric circles. In any case, the curvature of the track 110 changes as one moves in a radial direction 112 across the medium 102. For example, as one moves from the inner edge 104 to the outer edge 106, one encounters decreasing track curvature, and vice versa.

The medium 102 is mounted to a first motor 120, operably coupled 122 to circuitry 124 so that it can be rotated 125 at desired speeds during operation. Also secured to the disc drive housing 126 is a second motor 128, operably coupled 122 to circuitry 124, for controllably driving an actuator 130. The actuator 130 may include an arm 132 and a suspension assembly 134 supported at a distal end 136 of the arm 132. The suspension assembly 134 may include a flexibly supported slider 200, which in turn carries transducers (not shown) for recording data to the medium 102 or for retrieving data from the medium 102. In this manner, transducers can be supported and moved to different tracks 110, that is, to different radial locations of the medium 102.

Figure 2:
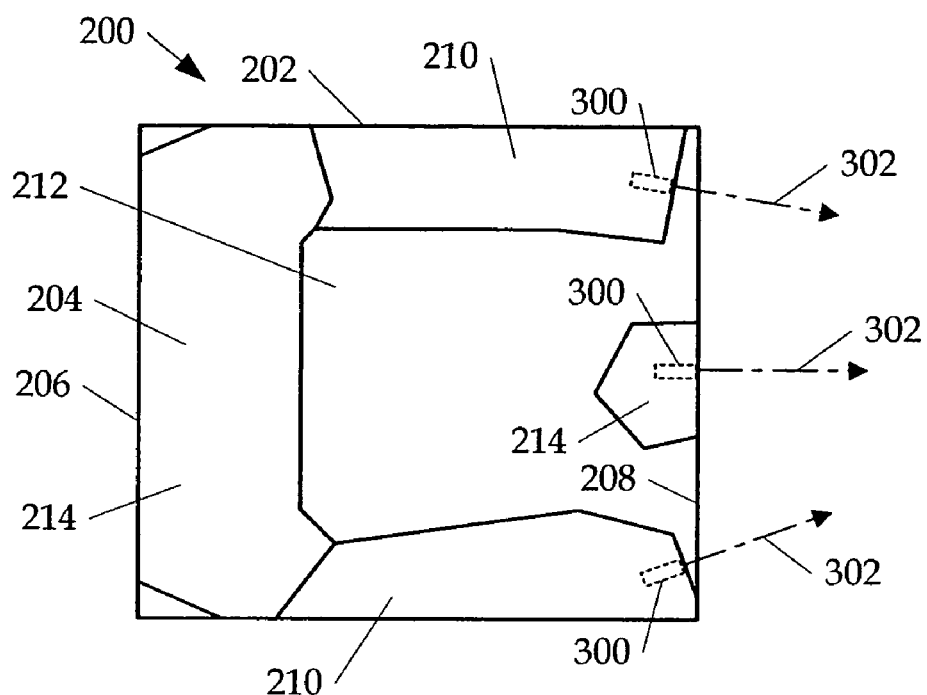
FIG. 2 is a schematic view of a slider from the medium.

FIG. 2 illustrates a schematic view of the slider 200 from the medium 102. The slider 200 includes a body 202 with a surface 204 (referred to generally as the air bearing surface) that opposes the medium 102 when in use. When the disc drive 100 is in operation, the medium 102 and the slider 200 will be in relative motion to each other. For example, the second motor 128 may hold the actuator 130 somewhat stationary while the first motor 120 keeps the medium 102 in rotation. At such a time, a point on the track will first see the leading edge 206 of the slider followed by the air bearing surface 204, and finally the trailing edge 208 of the slider.

The slider 200, and in particular the air bearing surface 204, may be shaped to promote stability of the slider 200 in the resulting airflow. For example, the slider 200 may be shaped to be thicker at the two opposing sides 210 (referred to as side rails) which extend generally from the leading edge 206 to the trailing edge 208. Some sliders 200 have one or more recessed areas 212 or protruding areas 214 generally at the center of the air bearing surface. In some cases, the trailing edge is at a chamfer 216. Air bearing surface configurations come in great variety, and the examples mentioned here are solely for illustration and not intended to be limiting.

The slider 200 is provided with at least two transducers 300 oriented in different directions 302. Alternatively described, the transducers 300 are angularly displaced from one another, such that not all of the writers on the same slider face the same direction at any one time.

Figure 3:
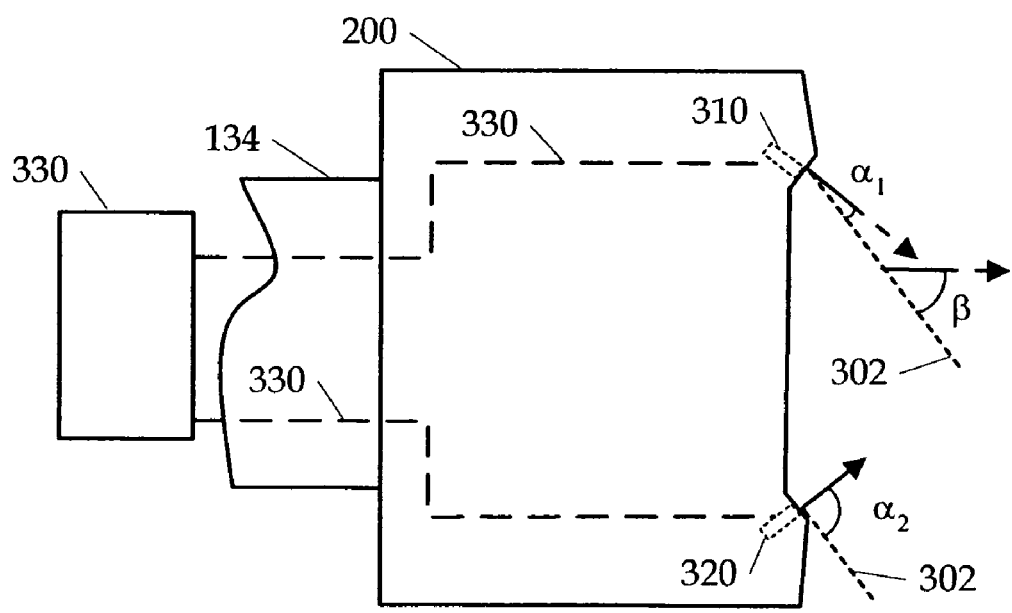
FIG. 3. is a schematic view of the slider according to some embodiments of the present invention.

In the example of FIG. 3, when the slider 200 is skew at an angle β relative to the direction of the track of interest (or track tangent) 302, a first transducer 310 shows a smaller angular displacement of $\alpha_1$ from the same track tangent 302, and a second transducer 320 shows a larger angular displacement of $\alpha_2$ from that track tangent 302. The disc drive includes circuitry 330 configured to selectively operate the transducers 310, 320. Here, the transducer having the smaller skew angle relative to the track tangent will be used for writing to that track, while the other transducer will be switched off or left out of operation. The result is that the disc drive operates with a smaller effective skew angle at this track.

Previously, tracks near the edges 104, 106 of the medium 102 are not used because the skew angle β would have been very large, thus requiring wide spacing between adjacent tracks 110 to avoid overwriting and data corruption among other problems. However, by implementing an embodiment of the present invention, even the effective skew angles near the edges of the medium can be reduced. Thereby making it feasible to use these previously unusable areas. In this fashion, the overall data storage capacity of a medium, and accordingly of the entire data storage device, can be increased.

Figure 4:
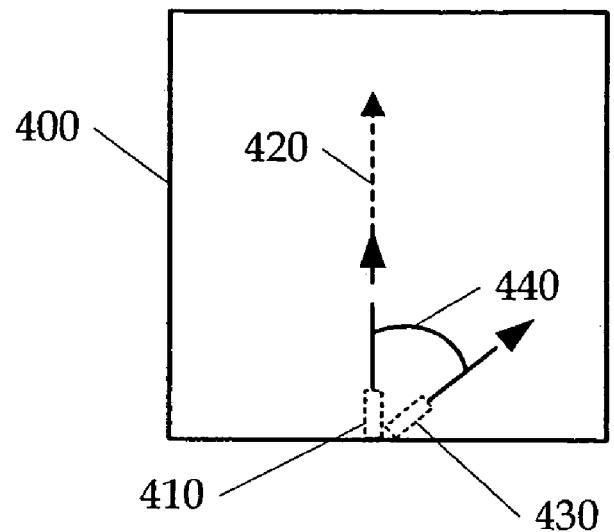
FIG. 4 is a schematic view of a slider according to alternative embodiments of the present invention.

Various embodiments may be implemented to suit the configuration of the data storage device. For example, the transducer support 400 of FIG. 4 is provided with at least one transducer 410 that is aligned with the transducer support orientation 420 and at least one other transducer 430 that is fixed at an angular displacement 440 from the transducer support orientation 420. Further, the appended drawings show the transducers positioned near the trailing edge because most sliders are configured such that their trailing edges will be closest to the medium. However, this does not exclude other possible locations for the transducers if so desired.

The examples show the transducers in question to be configured for interacting with the same piece of medium 102 or contiguous recordable parts of a medium 102. In some cases, the area or range of the medium 102 that may be affected by a first transducer (such as 310, 410) may overlap with that of a second transducer (such as 320, 430) which is oriented at a substantially non-zero angle (such as represented by $\alpha_1$-$\alpha_2$ or 440) relative to the first transducer (such as 310, 410).

Figure 5:
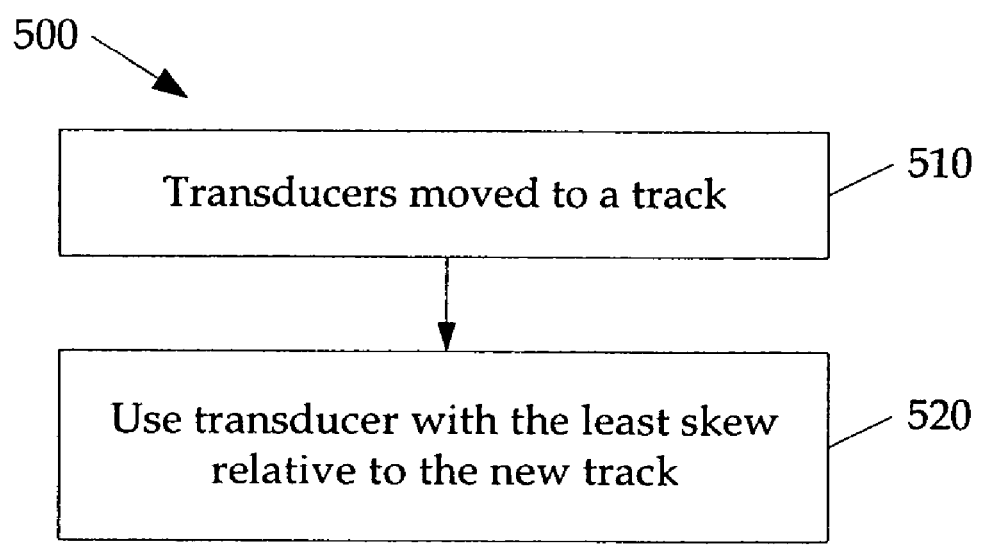
FIG. 5 is a flowchart according to other embodiments of the present invention.

FIG. 5 is a flowchart 500 of another embodiment of the present invention which provides a system capable of determining the writer that would have the smallest effective skew angle relative to the tangent of the track of interest, and selecting that writer for operation. As the actuator seeks out a track for the next operation 510, the system makes the appropriate switch to the writer that will have the best skew angle value 520.

According to other embodiments of the present invention, the transducers 300 are spaced apart on the slider 200. As shown in FIG. 2, at least one transducer 300 may be found at each of the side rails 210. Thus, the transducers 300 can write to a bigger area without the need to increase the range of movement of the actuator 130. This is particularly advantageous in systems where the slider 200 is likely to become unstable if it is too near the outer edge 106 of the medium 102.

It is to be understood that the foregoing disclosure is illustrative only, and changes may be made in detail, especially in matters of structure and arrangement of parts within the principles of the present invention to the full extent indicated by the broad general meaning of the terms in which the appended claims are expressed. For example, in some embodiments, a transducer may comprise separate apparatus for writing data to the medium (writers) and for reading data from the medium (readers). Alternatively, a transducer may comprise a single apparatus capable of both recording and retrieving data.

What is claimed is:

1. A transducer apparatus comprising:
   a support; and
   at least two transducers affixed to the support, the transducers being oriented other than substantially zero or 180 degrees relative to one another and the transducers are further configured for relative motion to the support in a first direction which is oriented at a skew angle relative to the support, in which at least one of the transducers is oriented at an angle smaller than the skew angle relative to the first direction; and
   circuits coupled to the transducers, the circuits being configured for selectively operating the transducers to select for operation the transducer that is oriented at a smallest angle from the first direction.

2. The apparatus of claim 1, in which the transducers are similar to one another.

3. The apparatus of claim 1, in which at least one of the transducers is oriented at an angle other than substantially zero relative to the support.

4. The apparatus of claim 1, in which the transducers are located spaced apart from one another.

5. The apparatus of claim 4, in which the support comprises a face and two opposing sides delimiting the face, and in which the transducers are located generally at the sides.

6. The apparatus of claim 1 for use with a medium, in which all the transducers are configured for use with the same medium.

* * * * *